United States Patent [19]

Hefner, Jr.

[11] Patent Number: 4,546,131

[45] Date of Patent: Oct. 8, 1985

[54] POLYMER MODIFIED CYANATE MIXTURE AND EPOXY RESINS THEREOF

[75] Inventor: Robert E. Hefner, Jr., Lake Jackson, Tex.

[73] Assignee: The Dow Chemical Company, Midland, Mich.

[21] Appl. No.: 691,801

[22] Filed: Jan. 15, 1985

[51] Int. Cl.$^4$ .......... C08G 59/26; C08G 59/32/59/62; C08G 73/06
[52] U.S. Cl. .................. 523/466; 523/467; 523/468; 525/109; 525/113; 525/132; 525/423; 528/96; 528/99
[58] Field of Search ............ 523/466, 467, 468; 525/109, 113, 132, 423; 528/99, 96

[56] References Cited

U.S. PATENT DOCUMENTS

| | | | |
|---|---|---|---|
| 4,142,034 | 2/1979 | Schroll | 528/99 X |
| 4,477,629 | 10/1984 | Hefner | 528/99 X |
| 4,487,915 | 12/1984 | Hefner | 528/96 |
| 4,489,202 | 12/1984 | Hefner | 528/99 X |
| 4,506,063 | 3/1985 | Hefner | 528/99 X |

*Primary Examiner*—Earl Nielsen
*Attorney, Agent, or Firm*—J. G. Carter

[57] ABSTRACT

Novel thermosettable compositions comprising a mixed cyanate of a polyphenol containing a copolymer of an ethylenically unsaturated compound and an alkenylphenyl cyanate are disclosed. These compositions are also useful in the preparation of novel epoxy resin compositions.

22 Claims, No Drawings

POLYMER MODIFIED CYANATE MIXTURE AND EPOXY RESINS THEREOF

BACKGROUND OF THE INVENTION

The present invention provides novel thermosettable compositions comprising a mixed cyanate of a polyphenol containing a copolymer of an ethylenically unsaturated compound and an alkenylphenyl cyanate, as well as novel hydroxyaromatic oligomers, epoxy resins and advanced epoxy resins thereof.

Preparation of the mixed cyanate of a polyphenol is taught by R. E. Hefner, Jr. in U.S. Pat. No. 4,489,202. In the process, a polyphenol such as 4,4'-isopropylidenediphenol (Bisphenol A) is reacted with less than a stoichiometric equivalent of a cyanogen chloride or bromide in the presence of a suitable base, such as triethylamine. This provides a mixture of monocyanate, dicyanate and, optionally, unreacted polyphenol. Trimerization of this mixture provides hydroxyaromatic oligomers containing the triazine group. The oligomers and unreacted polyphenol, if any, are then epoxidized using methods well known in the art.

Preparation of hydroxyaromatic oligomers containing both triazine and oxazoline groups is taught by R. E. Hefner, Jr. in U.S. Pat. No. 4,487,915. In the process, the mixed cyanate of a polyphenol and an epoxy resin, such as a diglycidyl ether of Bisphenol A, are co-oligomerized. The oligomers and unreacted polyphenol, if any, are then epoxidized using methods well known in the art.

Preparation of advanced epoxy resin compositions containing triazine or both triazine and oxazoline groups is taught by R. E. Hefner, Jr. in application Ser. No. 582,415 filed Feb. 22, 1984, now abandoned. In the process, the hydroxyaromaatic oligomers containing triazine groups or both triazine and oxazoline groups and an epoxy resin, such as the diglycidyl ether of Bisphenol A are reacted in an advancement reaction.

Although each of the aforementioned inventions provide thermosettable resin compositions which, when cured, possess excellent thermal stability and mechanical properties, there is room for additional improvement in the overall mechanical properties, especially tensile strength and elongation. Furthermore, there is substantial room for improvement in the moisture resistance of the aforementioned cured resin compositions. The present invention therefore provides a thermosettable resin which when cured has an improvement in one or more of the properties selected from tensile strength, elongation and moisture resistance.

SUMMARY OF THE INVENTION

The present invention concerns a composition which comprises a mixture of:
(A) from about 0.5 to about 95, preferably from about 5 to about 50, most preferably from about 10 to about 25 percent by weight (%bw) of the combined weight of components (A) and (B) of a product resulting from copolymerizing
 (1) from about 0.1 to about 50, preferably from about 0.5 to about 15, most preferably from about 1 to about 5 percent by weight (%bw) of the combined weight of components (A-1) and (A-2) of at least one alkenylphenyl cyanate represented by the formula

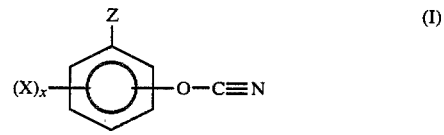

wherein Z is a

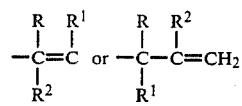

group;
each R, $R^1$ and $R^2$ is independently hydrogen or a hydrocarbyl group having from 1 to about 3 carbon atoms; each X is independently hydrogen, a hydrocarbyl or hydrocarbyloxy group having from 1 to about 4 carbon atoms, chlorine, bromine or a phenyl group; and x has a value of 4; and
 (2) from 50 to about 99.9, preferably from about 85 to about 99.5, most preferably from about 95 to about 99, %bw of the combined weight of components (A-1) and (A-2) of at least one ethylenically unsaturated monomer; and
(B) from about 5 to about 99.5, preferably from about 50 to about 95, most preferably from about 75 to about 90, %bw of the combined weight of components (A) and (B) of a mixed cyanate of a polyphenol.

Another aspect of the present invention pertains to a composition comprising a polymer modified hydroxyaromatic triazine-containing oligomer resulting from trimerization of the mixture containing the copolymerization product of at least one alkenylphenyl cyanate (A-1) and at least one ethylenically unsaturated monomer (A-2) and a mixed cyanate of a polyphenol (B).

Another aspect of the present invention pertains to a composition comprising a polymer modified hydroxyaromatic triazine-containing and oxazoline-containing oligomer resulting from cooligomerization of
(1) the mixture containing the copolymerization product of at least one alkenylphenyl cyanate (A-1) and at least one ethylenically unsaturated monomer (A-2) and a mixed cyanate of a polyphenol (B) and
(2) an epoxy resin or mixture of epoxy resins represented by formulas IX, X, XI, XII in the specification wherein the combined weight of components (1) and (2) provide from about a 1:1 to about a 1:100, preferably from about a 1:10 to about a 1:40, most preferably from about a 1:10 to about a 1:20 mole ratio of epoxy groups to cyanate groups.

Another aspect of the present invention pertains to an epoxy resin composition resulting from dehydrohalogenating the reaction product of
(1) at least one of
 (a) a polymer modified hydroxyaromatic triazine-containing oligomer,
 (b) a polymer modified hydroxyaromatic triazine-containing and oxazoline-containing oligomer, or
 (c) a combination of (1a) and (1b); and
(2) an epihalohydrin.

Another aspect of the present invention pertains to an advanced epoxy resin composition resulting from reacting
(1) at least one of (a) a polymer modified hydroxyaromatic triazine-containing oligomer, (b) a polymer modified hydroxyaromatic triazine-containing and oxazoline-containing oligomer, or (c) a combination of (1a) and (1b); and (2) at least one epoxy resin represented by formulas IX, X, XI, XII in the specification, and wherein components (1) and (2) are employed in quantities which provide a hydroxyl to epoxy mole ratio of from about 0.01:1 to about 0.99:1, preferably about 0.05:1 to about 0.70:1, most preferably about 0.10:1 to about 0.50:1.

Another aspect of the present invention pertains to the product resulting from curing a composition comprising (A) the aforementioned epoxy resins or advanced epoxy resins and (B) a curing quantity of a catalyst and/or curing agent therefor.

DETAILED DESCRIPTION OF THE INVENTION

The alkenylphenyl cyanates employed herein which are represented by formula I are prepared by reaction of a stoichiometric quantity or a slight stoichiometric excess (up to about 20 percent excess) of a cyanogen halide and stoichiometric or a slight stoichiometric excess (up to about 5 percent excess) of a base per hydroxyl group with an alkenyl phenol represented by formula

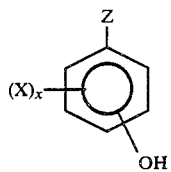
(II)

wherein Z, R, $R^1$, $R^2$, X and x are as hereinbefore defined. Suitable cyanogen halides include cyanogen bromide and cyanogen chloride. Alternately, the method of Martin and Bauer described in *Organic Synthesis*, Volume 61, pp. 35–68 (1983) and published by John Wiley and Sons can be used to generate the required cyanogen halide in situ from sodium cyanide and a halogen such as chlorine or bromine. Suitable bases include both inorganic bases and tertiary amines such as sodium hydroxide, potassium hydroxide, triethylamine, pyridine, lutidine, mixtures thereof and the like. Most preferred as the base is triethylamine. Suitable solvents include water, acetone, chlorinated hydrocarbons, ketones, mixtures thereof and the like. Most preferred solvents are acetone and methylene chloride. Reaction temperatures of from about $-40°$ to about $60°$ C. are operable with temperatures of $-20°$ to $25°$ C. being preferred.

Particularly suitable alkenylphenyl cyanates which can be employed herein include, for example, p-isopropenylphenyl cyanate, p-vinylphenyl cyanate, m-vinylphenyl cyanate, methyl-p-isopropenylphenyl cyanate, 3-chloro-4-isopropenylphenyl cyanate, p-allylphenyl cyanate, p-methallylphenyl cyanate, m-allylphenyl cyanate, 2,6-dimethyl-4-allylphenyl cyanate, mixtures thereof and the like. It is most preferred that the alkenylphenyl cyanate be substantially free of dimeric and/or oligomeric components although it is operable to use an alkenylphenyl cyanate containing substantial (up to 90 pbw) dimeric and/or oligomeric components. Said components are formed during the cyanation reaction of an alkenylphenol containing the corresponding dimeric diphenols and/or oligomeric polyphenols.

The mixed cyanate of a polyphenol employed herein can be prepared by the reaction of at least 0.01 but not more than 0.95, preferably from about 0.05 to about 0.55, mole of a cyanogen halide or mixture of cyanogen halides per mole of aromatic hydroxyl groups in the presence of a suitable base in a quantity of from about 0.01 to about 1.0, preferably from about 0.05 to about 0.6 mole per mole of aromatic hydroxyl groups with an aromatic polyphenol represented by the formulas

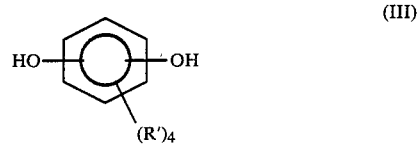
(III)

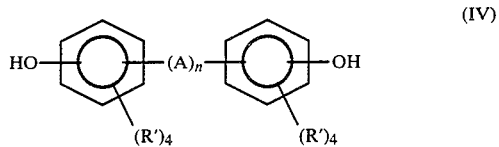
(IV)

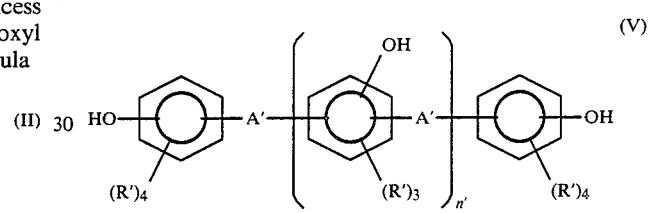
(V)

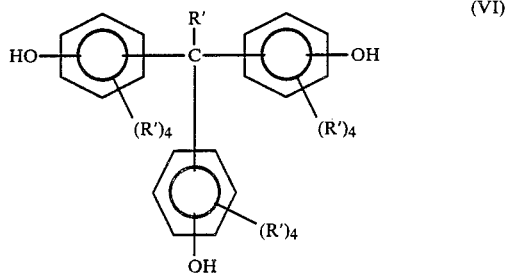
(VI)

wherein each A is independently a divalent hydrocarbon group having from 1 to about 12, preferably from about 1 to about 6 carbon atoms,

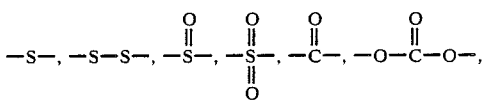

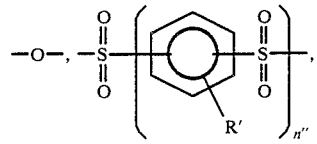

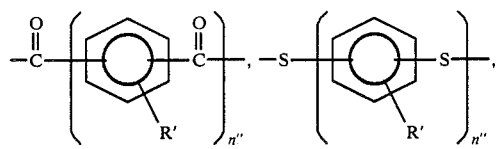

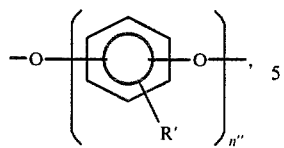

and the like; each A' is a divalent hydrocarbyl group having from 1 to about 3, preferably 1, carbon atoms or a

group; each R' is independently hydrogen or a hydrocarbyl group having from 1 to about 6 carbon atoms or a halogen, preferably chlorine or bromine; n has a value of zero or 1; n' has a value from about 0.001 to about 6, preferably from about 0.1 to about 2; n" has a value from about 1 to about 100, preferably from about 1 to about 10; and p has a value of from zero to about 10, preferably from zero to 3.

Suitable cyanogen halides which can be employed to prepare the cyanate mixture precursor include, for example, cyanogen chloride, cyanogen bromide, mixtures thereof and the like.

If desired, the method reported in Organic Synthesis, Vol. 61, pages 35–68 (1983), published by John Wiley & Sons, may be used to generate the required amount of cyanogen halide in situ, although this is less preferred than using neat cyanogen halide.

Suitable base materials which can be employed to prepare the cyanate mixture precursor include both inorganic bases and tertiary amines, such as, for example, sodium hydroxide, potassium hydroxide, triethylamine, pyridine, lutidine, mixtures thereof and the like. The tertiary amines are most preferred as the base material.

Suitable solvents include water, acetone, chlorinated hydrocarbons, ketones, mixtures thereof and the like. The ketones and chlorinated hydrocarbons are most preferred as the solvent.

Reaction temperatures of from about −40° to about 60° C. are operable with temperatures of −20° to 25° C. being preferred.

The ethylenically unsaturated compounds which can be employed herein include, for example, both acrylic monomers and vinyl aromatic monomers. Most preferred as the ethylenically unsaturated compound are the acrylate esters represented by the formula $$R^3-O-\overset{O}{\underset{\|}{C}}-\overset{R^4}{\underset{|}{C}}=CH_2 \quad (VII)$$

wherein $R^3$ is a hydrocarbyl group having from 2 to about 25 carbon atoms and may be branched, cyclic or polycyclic and $R^4$ is hydrogen or a methyl group; the vinyl aromatic monomers represented by the formula

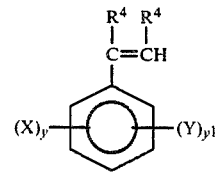

wherein $R^4$ and X are as hereinbefore defined, each Y is independently hydrogen, a hydrocarbyl or hydrocarbyloxy group having from 1 to about 4 carbon atoms, chlorine, bromine, a phenyl group, or a

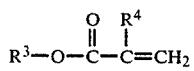

group; y has a value of 1 to 4; $y^1$ has a value of 1 or 2; and the total value of y plus $y^1$ is 5; or mixtures thereof.

Typical acrylate esters represented by formula VII include ethyl acrylate, n-butyl acrylate, n-butyl methacrylate, sec-butyl acrylate, 2-ethylhexyl acrylate, 2-ethylhexyl methacrylate, n-dodecyl acrylate, cyclohexyl acrylate, methyl cyclohexyl acrylate, norbornyl acrylate, dicyclopentadiene acrylate, methyl dicyclopentadiene acrylate, mixtures thereof and the like.

Typical vinyl aromatic monomers represented by formula VIII include styrene, o-methyl styrene, m-methyl styrene, p-methyl styrene, α-methyl styrene, chlorostyrene, bromostyrene, t-butyl styrene, phenyl styrene, p-methoxy styrene, t-butyl-α-methyl styrene, mixtures thereof and the like.

Although less preferred, any other of the ethylenically unsaturated monomers can be employed herein either alone or in any combination. Typical of these compounds are butadiene, allyl benzene, diallyl benzene, diallylphthalate, acrylonitrile, vinyl acetate, divinyl benzene, trimethylolpropanetriacrylate, hexanediol dimethacrylate, vinyl naphthalene, the polyethoxyacrylate or dicyclopentadiene, mixtures thereof and the like.

Compositions which comprise an alkenylphenyl cyanate, a cyanate mixture, and an ethylenically unsaturated compound may be polymerized either simultaneously or in stages. In a most preferred process, an alkenylphenyl cyanate and an ethylenically unsaturated compound are first copolymerized in the presence of 0.001 to 2 percent of a suitable free radical forming catalyst and at a suitable reaction temperature while in solution or mixed in the cyanate mixture. Operable free radical forming catalysts include but are not limited to the organic peroxides or hydroperoxides, persulfates, and azo or diazo compounds. Most preferred free radical forming catalysts are t-butyl peroxybenzoate, azobisisobutyronitrile, dicumylperoxide and di-t-butylperoxide. Suitable reaction temperatures are from about 65° C. to about 125° C. The alkenylphenyl cyanate and ethylenically unsaturated compound may first be mixed to form a solution which is added to the cyanate mixture. Alternately, the ethylenically unsaturated compound may be added to a solution or mixture of the alkenylphenyl cyanate and cyanate mixture. The product resulting from this copolymerization is an ethylenically unsaturated compound and alkenylphenyl cyanate copolymer dissolved in or mixed with a cyanate mixture. This product may be trimerized (homopolymerized) by heating from 50° C. to 350° C. or more, preferably by heating from 70° C. to 200° C. and optionally in the presence of from about 0.001 to about 5 percent of a suitable trimerization catalyst. Operable trimerization catalysts include those taught by Oehmke in U.S. Pat. No. 3,694,410 and by Sundermann, et al in U.S. Pat. No. 4,094,852. Most preferred trimerization catalysts are cobalt naphthanate and cobalt octoate. Prepolymerization (B-staging) may be affected by using lower reaction temperatures and/or shorter reaction times. Trimerization of the prepolymerized product may then be completed at a later time or immediately following prepolymerization to comprise a single trimerization step.

In an alternate process, an alkenylphenyl cyanate, an ethylenically unsaturated compound and a cyanate mixture are simultaneously polymerized by heating from 50° to 350° C. or more, preferably by heating from 70° to 200° C. and optionally in the presence of from about 0.001 to about 5 percent of a suitable trimerization catalyst and, optionally, 0.001 to 2 percent of a suitable free radical forming catalyst. Operable catalysts include those previously described herein. In this process, unless the ethylenically unsaturated compound boils at a temperature substantially above that of the polymerization temperature, it can volatilize thus inducing bubbles in the polymeric product.

In a further, although less preferred, process of the invention, an alkenylphenyl cyanate and an ethylenically unsaturated compound are copolymerized in the presence of a suitable quantity, usually from about 0.001 to about 5 percent, of a free radical forming catalyst and at a suitable reaction temperature, usually from about 65° C. to about 140° C. The resulting ethylenically unsaturated compound and alkenylphenyl cyanate copolymer is then added to the cyanate mixture. This product may be trimerized as previously described.

The trimerized (homopolymerized) products are hydroxyaromatic triazine functional oligomers containing the copolymer of an ethylenically unsaturated compound and an alkenylphenyl cyanate wherein the copolymer of the ethylenically unsaturated compound and an alkenylphenyl cyanate is chemically linked to the triazine oligomer structure.

Compositions which comprise an alkenylphenyl cyanate (formula I), a cyanate mixture, an ethylenically unsaturated compound and an epoxy resin (formula IX, X, XI, XII) may be polymerized either simultaneously or in stages. In a most preferred process, an alkenylphenyl cyanate and an ethylenically unsaturated compound are first copolymerized as previously described herein while in solution or mixed in the cyanate mixture. The product resulting from this copolymerization is an ethylenically unsaturated compound and alkenylphenyl cyanate copolymer dissolved in or mixed with a cyanate mixture. This product may be mixed with an epoxy resin to provide a mole ratio of epoxy groups to cyanate groups of about 1 to 10 to about 1 to 100, preferably 1 to 10 to about 1 to 40. This mixture may then be co-oligomerized using the method previously described herein for the trimerization reaction.

Copolymerization of the polymer modified cyanate mixture and an epoxy resin wherein a mole ratio of about 1 to 1 to about 1 to 9 epoxy groups to cyanate groups is employed provides a polymer which is insoluble in the reactants and solvents typically used in an epoxidation reaction. This polymer is useful as a thermoset (cured) resin.

In an alternate process, an alkenylphenyl cyanate, an ethylenically unsaturated compound, a cyanate mixture and an epoxy resin are simultaneously polymerized as previously described herein.

In a further, although less preferred, process of the invention, an alkenylphenyl cyanate and an ethylenically unsaturated compound are copolymerized as previously described herein. The resulting ethylenically unsaturated compound and alkenylphenyl cyanate copolymer is then added to the epoxy resin and cyanate mixture. This product may be co-oligomerized using the method previously described herein for the trimerization reaction.

The co-oligomerized products are hydroxyaromatic triazine and oxazoline functional oligomers containing the copolymer of an ethylenically unsaturated compound and an alkenylphenyl cyanate wherein the copolymer of the ethylenically unsaturated compound and an alkenylphenyl cyanate is chemically linked to the triazine and oxazoline oligomer structure.

Epoxidation of the hydroxyaromatic triazine or triazine and oxazoline functional oligomers containing the copolymer of an ethylenically unsaturated compound and an alkenylphenyl cyanate can be performed by the known methods described in *Handbook of Epoxy Resins* by Lee and Neville, McGraw-Hill (1967) which is incorporated herein by reference. This usually includes reacting the hydroxyaromatic oligomer product with an epihalohydrin followed by dehydrohalogenation with a basic-acting material such as an alkali metal hydroxide and finally recovering the resultant glycidyl ether product.

Suitable epoxy resins for advancement reaction with the hydroxyaromatic triazine or triazine and oxazoline functional oligomers containing the copolymer of an ethylenically unsaturated compound and an alkenylphenyl cyanate include, for example, those represented by the formulas

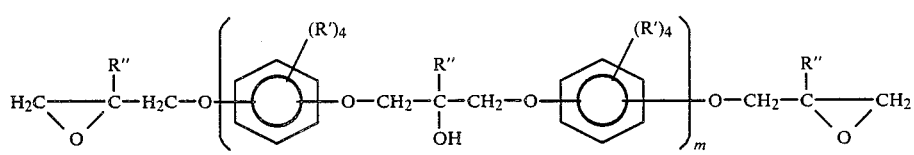

(IX)

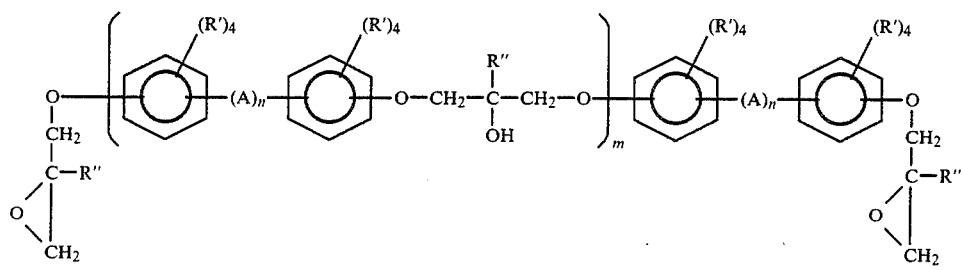

(X)

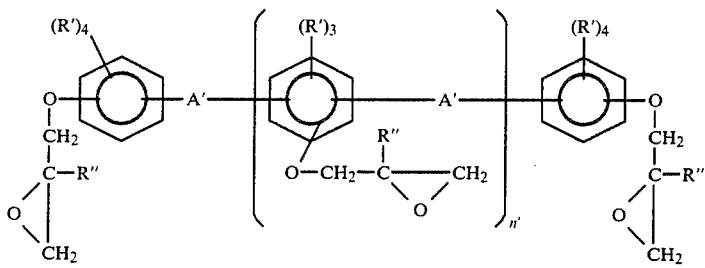

(XI)

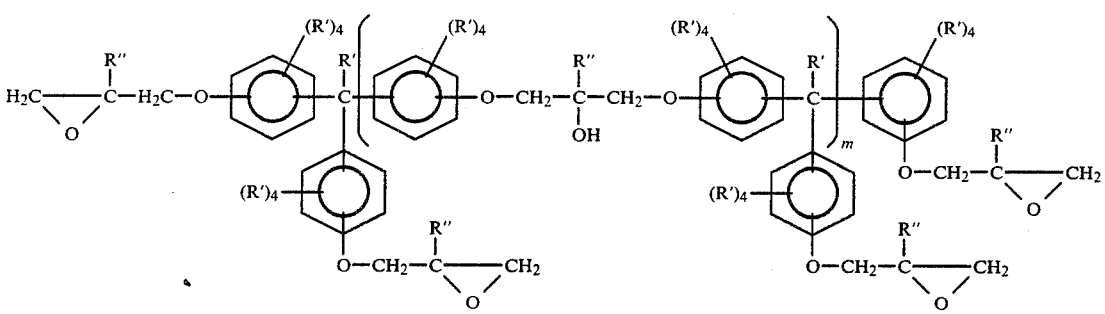

(XII)

wherein A, A', R', n and n' are as hereinbefore defined, R" is independently hydrogen or a hydrocarbyl group having from 1 to about 3 carbon atoms and m has a value from zero to about 40, preferably from 0.1 to about 5.

The advancement reaction is optionally, although preferably, performed in the presence of 0.01 to about 2.0 percent by weight of a suitable catalyst. Suitable catalysts include bases, basic acting materials, acids and the like. Preferred catalysts are the quaternary ammonium salts and phosphonium salts. A most preferred catalyst is benzyltrimethylammonium chloride. Reaction times and temperatures vary depending on the composition of the epoxy resin reactant used; the amount and type of catalyst used, if any; the presence of inert solvent, if any. Typically, the advancement reaction when catalyzed is conducted at a temperature of from about 50° C. to about 200° C., preferably from about 90° C. to about 120° C. for from about 15 minutes (900 s) to about 240 minutes (14400 s), preferably from about 30 minutes (1800 s) to about 90 minutes (5400 s). Advancement reaction times and temperatures are generally longer and/or higher, respectively, for the non-catalyzed reaction.

Suitable curing agents and/or catalysts for curing and/or preparing epoxy resins and advanced epoxy resins are described in the Handbook of Epoxy Resins by Lee and Neville, McGraw-Hill (1967), as well as U.S. Pat. Nos. 3,477,990; 3,948,855; and 4,366,295 which are incorporated herein by reference.

The cured epoxy resins and advanced epoxy resins of this invention possess improvements in one or more physical or mechanical properties such as tensile strength and percent elongation. Furthermore, the advancement reaction allows for incorporation of the hydroxyaromatic triazine or triazine and oxazoline functional oligomers containing the copolymer of an ethylenically unsaturated compound and an alkenylphenyl cyanate without having to epoxidize (i.e., react with an epihalohydrin followed by dehydrohalogenation) said oligomers.

The epoxy resins and advanced epoxy resins of the present invention can be used to prepare castings, coatings, laminates, composites, encapsulations and the like, and are especially suited for use in applications requiring high mechanical strength. If desired, solvent, fillers, pigments, flow control agents, dyes, fire suppressants and other additives can be employed.

The laminates or composites can be, if desired, reinforced with a suitable reinforcing material. Suitable reinforcing materials include natural or synthetic materials. Particularly suitable reinforcing materials include, for example, glass, carbon, graphite, aramid and the like. The reinforcing material can be in woven, mat, continuous filament, roving or random fiber form or any combination thereof.

The following examples are illustrative of the invention, but are not to be construed as to limiting the scope thereof in any manner.

EXAMPLE 1

A. Preparation of Diphenol Cyanate Mixture

Cyanogen bromide (1.65 moles, 174.79 grams) was added to a reactor containing a stirred solution of bisphenol A (3.00 moles, 684.90 grams) in acetone (1000 milliliters) cooled to −5° C. under a nitrogen atmosphere. The stirred solution was allowed to equilibrate at −5° C., then triethylamine (1.50 moles, 151.80 grams) was added to the reactor over a 26 minute (1560 s) period and so as to maintain the reaction temperature at −5° to −3° C. After completion of the triethylamine addition, the rector was maintained at −5° to −2° C. for an additional 30 minutes (1800 s), followed by addition of the reaction product to chilled water (1.5 gallons) with agitation. After 5 minutes (300 s), the water and product mixture was subjected to multiple extractions with three 500 milliliter portions of methylene chloride. The combined methylene chloride extracts were sequentially washed with 500 milliliters of dilute hydrochloric acid (1 percent), 800 milliliters of deionized water and then dried over anhydrous sodium sulfate. The dry methylene chloride extract was filtered and solvent removed by rotary evaporation under vacuum. The diphenol cyanate mixture was recovered (699.7 grams) as a light yellow colored solid at room temperature (25° C.). Infrared spectrophotometric analysis demonstrated the presence of the nitrile functionality as well as unreacted hydroxyl functionality. Liquid chromatographic analysis demonstrated the presence of 57.06 area percent bisphenol A, 37.17 area percent bisphenol A monocyanate, and 5.77 area percent bisphenol A dicyanate.

B. Preparation of Acrylate Modified Diphenol Cyanate Mixture

A portion (200.0 grams) of the diphenol cyanate mixture from A above was added to a reactor and heated to 110° C. under a nitrogen atmosphere with stirring. Azobisisobutyronitrile (0.50 gram) was added to the diphenol cyanate mixture, then 2 minutes (120 s) later, a mixture of p-isopropenylphenyl cyanate (12.5 grams) and 2-ethylhexylacrylate (37.5 grams) was added dropwise over a 20 minute (1200 s) period. After completion of the p-isopropenylphenyl cyanate and 2-ethylhexylacrylate addition, the reactor was maintained at the 110° C. reaction temperature for 60 minutes (3600 s). The diphenol cyanate mixture containing copoly(p-isopropenylphenyl cyanate and 2-ethylhexylacrylate) was recovered in essentially quantitative yield.

C. Trimerization of Diphenol Cyanate Mixture Containing Copoly(p-isopropenylphenyl cyanate and 2-ethylhexylacrylate)

The diphenol cyanate mixture containing copoly(p-isopropenylphenyl cyanate and 2-ethylhexylacrylate) from B above and 6.0 percent cobalt naphthenate (0.10 percent by weight, 0.25 gram) were added to a reactor and heated to 177° C. under a nitrogen atmosphere with stirring. After 2.0 hours (7200 s) at the 177° C. reaction temperature, the polymer modified hydroxyaromatic oligomers containing triazine groups were recovered in quantitative yield as a transparent, light amber-colored solid at room temperature (25° C.). Infrared spectrophotometric analysis of a film sample of the product demonstrated complete disappearance of the cyanate functionality, appearance of the triazine functionality, the presence of unreacted hydroxyl functionality and the presence of acrylate ester functionality.

EXAMPLE 2

A. Epoxy Resin Advancement with Polymer Modified Hydroxy-aromatic Oligomers Containing Triazine Groups A portion (38.66 grams, 0.20 mole hydroxyl groups) of the polymer modified hydroxyaromatic oligomers containing triazine groups from Example 1-C, a commercial grade of bisphenol A diglycidyl ether (217.84 grams, 0.60 mole) having an epoxide equivalent weight (EEW) of 181.5 and 60 percent aqueous benzyltrimethylammonium chloride (0.249 gram) catalyst were added to a reactor and heated to 120° C. with stirring under a nitrogen atmosphere. After 60 minutes (3600 s) at the 120° C. reaction temperature, the reactor was cooled and the epoxy resin advanced with polymer modified triazine functional oligomers was recovered as a transparent, light yellow-colored liquid. Epoxide titration revealed 15.33 percent epoxide in the resin.

B. Curing of Epoxy Resin Advanced with Polymer Modified Hydroxyaromatic Oligomers Containing Triazine Groups A portion (240.6 grams, 0.8592 mole epoxide groups) of the epoxy resin advanced with polymer modified hydroxyaromatic oligomers containing triazine groups from A above was heated to 100° C. and blended with methylenedianiline (42.53 grams, 0.2148 mole) which was also heated to 100° C. This mixture was used to prepare a clear, unfilled ⅛ inch (0.3175 cm) casting for heat distortion temperature (264 psi, 1820 kPa), tensile and flexural strength, flexural modulus, percent elongation and average Barcol hardness (934-1 scale) determinations. The casting was cured at 75° C. for 2.0 hours (7200 s) followed by post curing at 125° C. for 2 hours (7200 s), 175° C. for 2 hours (7200 s), then 200° C. for 2 hours (7200 s). Mechanical properties of tensile (8) and flexural (6) test pieces were determined using an Instron machine with standard test methods (ASTM D-638 and D-790). Heat distortion temperature of clear casting test pieces (2) was determined using an Aminco Plastic Deflection Tester (American Instrument Co.) with standard test methods (ASTM D-648 modified). The results are reported in Table I.

COMPARATIVE EXPERIMENT A

1. Preparation and Trimerization of Diphenol Cyanate Mixture

A diphenol cyanate mixture was prepared using the method of Example 1-A. Liquid chromatographic analysis demonstrated the presence of 56.00 area percent bisphenol A, 34.89 area percent bisphenol A monocyanate, and 9.11 area percent bisphenol A dicyanate. A portion (415.0 grams) of the diphenol cyanate mixture and 6.0 percent cobalt naphthenate (0.10 percent by weight, 0.42 gram) were added to a reactor and heated to 177° C. under a nitrogen atmosphere with stirring. After 2 hours (7200 s) at the 177° C. reaction temperature, the hydroxyaromatic oligomers containing triazine groups were recovered in quantitative yield as a transparent, light amber-colored solid at room temperature (25° C.). Infrared spectrophotometric analysis of a film sample of the product demonstrated complete disappearance of the cyanate functionality, appearance of the triazine functionality and the presence of unreacted hydroxyl functionality.

2. Epoxy Resin Advancement with Hydroxyaromatic Oligomers Containing Triazine Groups A portion (31.84 grams, 0.20 mole hydroxyl groups) of the hydroxyaromatic oligomers containing triazine groups from 1 above, a commercial grade of bisphenol A diglycidyl ether (219.60 grams, 0.60 mole) having an EEW of 183 and 60 percent aqueous benzyltrimethylammonium chloride (0.251 gram) catalyst were added to a reactor and heated to 120° C. with stirring under a nitrogen atmosphere. After 60 minutes (3600 s) at the 120° C. reaction temperature, the reactor was cooled and the epoxy resin advanced with triazine functional oligomers was recovered as a transparent yellow colored liquid. Epoxide titration revealed 15.38 percent epoxide in the resin.

3. Curing of Epoxy Resin Advanced with Hydroxyaromatic Oligomers Containing Triazine Groups A portion (241.13 grams, 0.8374 mole epoxide groups) of the epoxy resin advanced with hydroxyaromatic oligomers containing triazine groups from 2 above was heated to 100° C. and blended with methylenedianiline (41.45 grams, 0.2093 mole) which also was heated to 100° C. This mixture was used to prepare a clear, unfilled casting using the method of Example 2-B. Mechanical properties were evaluated using the method of Example 2-B. The results are reported in Table I.

TABLE I

|  | Example 2 | Comparative Experiment A |
|---|---|---|
| Barcol Hardness | 33 | 38 |
| Heat Distortion Temperature (°C./°F.) | 143.5/290.3 | 147.5/297.5 |
| Tensile Strength, psi | 12,468 | 11,829 |
| kPa | 85,964 | 81,559 |
| Elongation (%) | 9.33 | 5.69 |
| Flexural Strength, psi | 19,294 | 21,415 |
| kPa | 133,028 | 147,652 |
| Flexural Modulus, psi | 361,000 | 421,000 |
| kPa | 2,489,023 | 2,902,711 |

EXAMPLE 3

A. Epoxidation of Polymer Modified Hydroxyaromatic Oligomers Containing Triazine Groups A portion (151.3 grams) of the polymer modified hydroxyaromatic oligomers containing triazine groups from Example 1-C, epichlorohydrin (4.8915 moles, 452.61 grams), isopropanol (35 percent by weight of epichlorohydrin used, 243.71 grams) and water (8 percent by weight of epichlorohydrin used, 39.36 grams) were added to a reactor and stirred under a nitrogen atmosphere at 50° C. until a solution was formed. Dropwise addition of a sodium hydroxide (1.761 moles, 70.44 grams) solution in water (281.76 grams) commenced and was completed over the next 45 minutes (2700 s). During this sodium hydroxide addition, the reaction temperature was allowed to increase to 60° C. and was then held at this temperature. Fifteen minutes (900 s) after the addition of sodium hydroxide solution, a second solution of sodium hydroxide (0.7826 mole, 31.31 grams) in water (125.24 grams) was added dropwise to the reactor over the next 20 minutes (1200 s). Fifteen minutes (900 s) later, the reactor was cooled to 40° C. then an initial water wash (400 grams) was added to the reactor. The reactor contents were transferred to a separatory funnel. The water wash layer was separated and discarded while the organic layer was added back into the separatory funnel along with a second water wash (600 milliliters). The water wash layer was separated and discarded while the organic layer was added back into the separatory funnel along with a final water wash (800 milliliters) and additional epichlorohydrin (200 milliliters). The recovered organic layer was stripped of solvents by rotary evaporation at 110° C. for 60 minutes (3600 s) under vacuum. The epoxy resin was recovered (200.9 grams) as a transparent, light amber-colored liquid at room temperature (25° C.). Infrared spectrophotometric analysis demonstrated substantially complete disappearance of hydroxyl functionality, appearance of epoxide functionality, presence of triazine functionality and presence of acrylate ester functionality. Epoxide titration revealed the presence of 19.55 percent by weight epoxide.

B. Curing of Epoxy Resin Prepared from Polymer Modified Hydroxyaromatic Oligomers Containing Triazine Groups A portion (195.4 grams, 0.8884 mole of epoxide groups) of the epoxy resin prepared from polymer modified hydroxyaromatic oligomers containing triazine groups from A above was heated to 100° C. and blended with methylenedianiline (43.98 grams, 0.2221 mole) which was also heated to 100° C. This mixture was used to prepare a clear, unfilled casting using the method of Example 2-B. Mechanical properties were evaluated using the method of Example 2-B. The results are reported in Table II.

COMPARATIVE EXPERIMENT B

1. Epoxidation of Hydroxyaromatic Oligomers Containing Triazine Groups

A diphenol cyanate mixture was prepared using the method of Example 1-A. Liquid chromatographic analysis demonstrated the presence of 55.82 area percent bisphenol A, 37.89 area percent bisphenol A monocyanate, and 6.29 area percent bisphenol A dicyanate. A portion of the diphenol cyanate mixture and 6.0 percent cobalt naphthenate were added to a reactor and trimerized at 177° C. using the method of Comparative Experiment A. A portion (215.0 grams) of the hydroxyaromatic oligomers containing triazine groups, epichlorohydrin (6.865 goles, 635.22 grams), isopropanol (35 percent by weight of epichlorohydrin used, 342.04 grams), and water (8 percent by weight of epichlorohydrin used, 55.24 grams) were added to a reactor and stirred under a nitrogen atmosphere at 60° C. until a solution was formed. At this time, the reactor was cooled to 50° C. and dropwise addition of a sodium hydroxide (2.4714 moles, 98.86 grams) solution in water (395.42 grams) commenced and was completed over the next 45 minutes (2700 s). During this sodium hydroxide addition, the reaction temperature was allowed to increase to 60° C. and was then held at this temperature. Fifteen minutes (900 s) after the addition of sodium hydroxide solution, a second solution of sodium hydroxide (1.0984 mole, 43.94 grams) in water (175.76 grams) was added dropwise to the reactor over the next 20 minutes (1200 s). Fifteen minutes (900 s) later, the reactor was cooled to 40° C. then an initial water wash (400 grams) was added to the reactor. The reactor contents were transferred to a separatory funnel containing additional epichlorohydrin (200 grams). The water wash layer was separated and discarded while the organic layer was added back into the separatory funnel along with a second water wash (200 grams). The organic layer was separated then added back into the separatory funnel along with a third water wash (200 grams). The water wash layer was separated and discarded while the organic layer was added back into the separatory funnel with a final water wash (1000 grams). Epichlorohydrin (200 grams) was added to the separatory funnel, then the water wash layer was separated and discarded. The recovered organic layer was stripped of solvents by rotary evaporation at 100° C. for 30 minutes (1800 s) under vacuum. The epoxy resin was recovered (272.4 grams) as a transparent, light yellow-colored liquid at room temperature (25° C.). Infrared spectrophotometric analysis demonstrated substantially complete disappearance of hydroxyl functionality, appearance of epoxide functionality and presence of triazine functionality. Epoxide titration revealed the presence of 21.55 percent by weight epoxide.

2. Curing of Epoxy Resin Containing Triazine Groups

A portion (265.0 grams, 1.3281 mole of epoxide groups) of the epoxy resin containing triazine groups from 1 above was heated to 75° C. and blended with methylenedianiline (65.74 grams, 0.3320 mole) which was also heated to 100° C. This mixture was used to prepare a clear, unfilled casting using the method of Example 2-B. Mechanical properties were evaluated using the method of Example 2-B. Mechanical properties were evaluated using the method of Example 2-B. The results are reported in Table II.

TABLE II

|  | Example 3 | Comparative Experiment B |
|---|---|---|
| Barcol Hardness | 39 | 42 |
| Heat Distortion Temperature (°C./°F.) | 126.75/260 | 152.75/307 |
| Tensile Strength, psi | 12,763 | 10,694 |
| kPa | 87,998 | 73,733 |
| Elongation (%) | 6.45 | 3.69 |
| Flexural Strength, psi | 23,420 | 21,709 |
| kPa | 161,476 | 149,679 |
| Flexural Modulus, psi | 624,000 | 519,000 |
| kPa | 4,302,355 | 3,578,401 |

EXAMPLE 4

A. Preparation of Acrylate and Vinyl Aromatic Monomer Modified Diphenol Cyanate Mixture A portion (140.0 grams) of the diphenol cyanate mixture from Example 1-A was added to a reactor and heated to 110° C. under a nitrogen atmosphere with stirring. A mixture of 2-ethylhexyl acrylate (42.0 grams), styrene (42.0 grams), p-isopropenylphenyl cyanate (9.33 grams) and t-butylperbenzoate catalyst (1.87 grams) was added dropwise over a 15 minute (900 s) period. After completion of the addition, the reactor was maintained at 110° C. for 13 minutes (780 s), 130° C. for 32 minutes (1920 s) then 140° C. for 45 minutes (2700 s). The diphenol cyanate mixture containing terepoly(p-isopropenylphenyl cyanate, styrene and 2-ethylhexyl acrylate) was recovered in essentially quantitative yield as a light amber colored, transparent, viscous liquid.

B. Trimerization of Diphenol Cyanate Mixture Containing Terepoly(p-isopropenylphenyl cyanate, styrene and 2-ethylhexyl acrylate)

The diphenol cyanate mixture containing terepoly(p-isopropenylphenyl cyanate, styrene and 2-ethylhexyl acrylate) from A above and 6.0 percent cobalt naphthenate (0.10 percent by weight, 0.23 gram) were added to a reactor and heated to 177° C. under a nitrogen atmosphere with stirring. After 2.0 hours (7200 s) at the 177° C. reaction temperature, the polymer modified hydroxyaromatic oligomers containing triazine groups were recovered in quantitative yield as an opaque light green colored solid at room temperature (25° C.). Infrared spectrophotometric analysis of a film sample of the product demonstrated complete disappearance of the cyanate functionality, appearance of the triazine functionality, the presence of unreacted hydroxyl functionality and the presence of acrylate ester functionality.

C. Epoxidation of Polymer Modified Hydroxyaromatic Oligomers Containing Triazine Groups A portion (189.0 grams) of the polymer modified hydroxyaromatic oligomers containing triazine groups from B above, epichlorohydrin (3.5139 moles, 325.14 grams), isopropanol (35 percent by weight of epichlorohydrin used, 175.08 grams), and water (8 percent by weight of epichlorohydrin used, 28.27 grams) were added to a reactor and stirred under a nitrogen atmosphere at 50° C. until a solution was formed. Dropwise addition of a sodium hydroxide (1.2650 moles, 50.60 grams) solution in water (202.40 grams) commenced and was completed over the next 45 minutes (2700 s). During this sodium hydroxide addition, the reaction temperature was allowed to increase to 60° C. and was then held at this temperature. Fifteen minutes (900 s) after the addition of sodium hydroxide solution, a second solution of sodium hydroxide (0.5622 mole, 22.49 grams) in water (89.96 grams) was added dropwise to the reactor over the next 20 minutes (1200 s). Fifteen minutes (900 s) later, the reactor was cooled to 40° C. then an initial water wash (400 grams) was added to the reactor. The remaining product workup and isolation was completed using the method of Example 3-A. The epoxy resin was recovered (218.3 grams) as an opaque, light amber colored liquid at room temperature (25° C.). Infrared spectrophotometric analysis demonstrated substantially complete disappearance of hydroxyl functionality, appearance of epoxide functionality, presence of triazine functionality and presence of acrylate ester functionality. Epoxide titration revealed the presence of 15.79 percent by weight epoxide.

D. Curing of Epoxy Resin Prepared from Polymer Modified Hydroxyaromatic Oligomers Containing Triazine Groups A portion (200.0 grams, 0.7344 mole of epoxide groups) of the epoxy resin prepared from polymer modified hydroxyaromatic oligomers containing triazine groups from C above was heated to 100° C. and blended with methylenedianiline (36.36 grams, 0.1836 mole) which was also heated to 100° C. This mixture was used to prepare a clear, unfilled casting using the method of Example 2-B. Mechanical properties were evaluated using the method of Example 2-B. The results are reported in Table III.

TABLE III

| | |
|---|---|
| Barcol Hardness | 21 |
| Heat Distortion Temperature, (°C./°F.) | 109.5/229.1 |
| Tensile Strength, psi | 8636 |
| kPa | 55,543 |
| Elongation (%) | 4.91 |
| Flexural Strength, psi | 17,246 |
| kPa | 118,908 |
| Flexural Modulus, psi | 374,000 |
| kPa | 2,578,655 |

EXAMPLE 5

A. Preparation of Acrylate Modified Cyanate Mixture

A portion (175.0 grams) of a diphenol cyanate mixture prepared using the method of Example 1-A was added to a reactor and heated to 110° C. under a nitrogen atmosphere with stirring. Azobisisobutyronitrile (0.44 gram) was added to the diphenol cyanate mixture, then 1 minute (60 s) later, a mixture of p-isopropenylphenyl cyanate (4.38 grams) and 2-ethylhexylacrylate (39.38 grams) was added dropwise over a 15 minute (900 s) period. After completion of the p-isopropenylphenyl cyanate and 2-ethylhexylacrylate addition, the reactor was maintained at the 110° C. reaction temperature for 60 minutes (3600 s). The diphenol cyanate mixture containing copoly(p-isopropenylphenyl cyanate and 2-ethylhexylacrylate) was recovered in essentially quantitative yield.

B. Copolymerization of Diphenol Cyanate Mixture Containing Copoly(p-isopropenylphenyl cyanate and 2-ethylhexylacrylate) and an Epoxy Resin A portion (100.2 grams) of the diphenol cyanate mixture containing copoly(p-isopropenylphenyl cyanate and 2-ethylhexylacrylate) from A above, a commercial grade of bisphenol A diglycidyl ether (130.78 grams) having an EEW of 181.5, 6.0 percent cobalt naphthenate (0.10 percent by weight, 0.23 gram) and 2,4,6-tri(-dimethylaminomethyl)phenol (0.10 percent by weight, 0.23 gram) were blended together while heating to 100° C. These weights of reactants provided a 1 to 1 mole ratio of epoxide groups to phenolic hydroxyl groups plus cyanate groups. This mixture was used to prepare a clear, unfilled casting using the method of Example 2-B. Mechanical properties were evaluated using the method of Example 2-B. The results are reported in Table IV.

TABLE IV

| | |
|---|---|
| Barcol Hardness | 36 |
| Heat Distortion Temperature (°C./°F.) | 70/158 |
| Tensile Strength, psi | 8319 |
| kPa | 73,996 |
| Elongation (%) | 2.0 |
| Flexural Strength, psi | 18,290 |
| kPa | 162,686 |
| Flexural Modulus, psi | 563,000 |
| kPa | 5,007,772 |

I claim:
1. A composition which comprises a mixture of
(A) from about 0.5 to about 95 percent by weight (%bw) of total composition of a product resulting from copolymerizing
  (1) from about 0.1 to about 50, %bw of the combined weight of components (A-1) and (A-2) of at least one alkenylphenyl cyanate represented by the formula

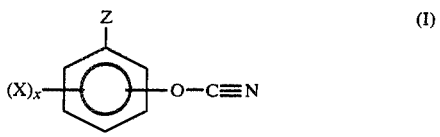

wherein Z is a

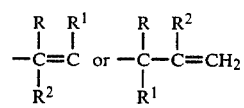

group;
each R, $R^1$ and $R^2$ is independently hydrogen or a hydrocarbyl group having from 1 to about 3 carbon atoms; each X is independently hydrogen, a hydrocarbyl or hydrocarbyloxy group having from 1 to about 4 carbon atoms, chlorine, bromine or a phenyl group; and x has a value of 4; and
  (2) from 50 to about 99.9 %bw of the combined weight of components (A-1) and (A-2) of at least one ethylenically unsaturated monomer; and
(B) from about 5 to about 99.5 %bw of total composition of a mixed cyanate of a polyphenol prepared by the reaction of at least 0.01 but not more than 0.95, mole of a cyanogen halide or mixture of cyanogen halides per mole of aromatic hydroxyl groups in the presence of a suitable base in a quantity of from about 0.01 to about 1.0, mole per mole of aromatic hydroxyl groups with an aromatic polyphenol represented by the formulas

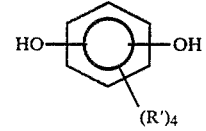

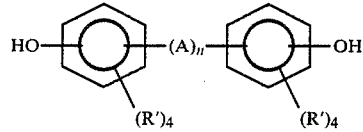

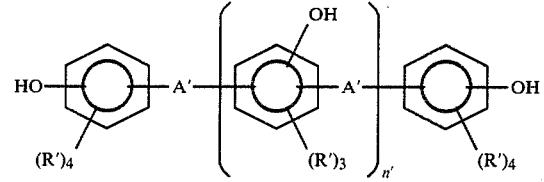

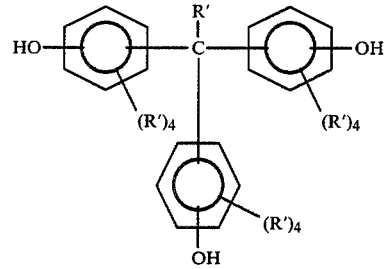

wherein each A is independently a divalent hydrocarbon group having from 1 to about 12, carbon atoms,

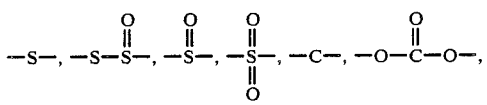

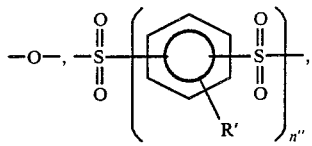

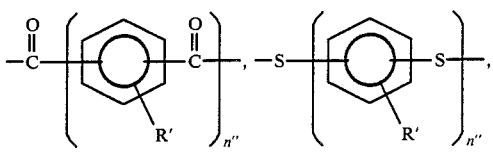

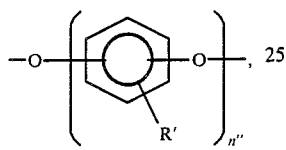

and the like;
each A' is a divalent hydrocarbyl group having from 1 to about 3, carbon atoms or a

group; each R' is independently hydrogen or a hydrocarbyl group having from 1 to about 6 carbon atoms or a halogen; n has a value of zero or 1; n' has a value from about 0.001 to about 6; n" has a value from about 1 to about 100; and p has a value of from zero to about 10.

2. A composition of claim 1 wherein
   (i) component (A) is present in quantities of from about 5 to about 50 %bw;
   (ii) component (A-1) is present in quantities of from about 0.5 to about 15 %bw;
   (iii) component (A-2) is present in quantities of from about 85 to about 99.5 %bw; and
   (iv) component (B) is present in quantities of from about 50 to about 95 %bw.

3. A composition of claim 2 wherein
   (i) component (A) is present in quantities of from about 10 to about 25 %bw;
   (ii) component (A-1) is present in quantities of from about 1 to about 5 %bw;
   (iii) component (A-2) is present in quantities of from about 95 to about 99 %bw; and
   (iv) component (B) is present in quantities of from about 75 to about 90 %bw.

4. A composition of claim 3 wherein
   (i) component (A-1) is an alkenylphenyl cyanate represented by formula I wherein

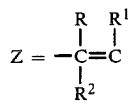

or a mixture thereof;
   (ii) component (A-2) is an acrylate ester represented by formula VII or a mixture thereof; and
   (iii) component (B) is a mixture of a diphenol, a monocyanate of a diphenol and a dicyanate of a diphenol.

5. A composition of claim 4 wherein component (A-2) is a vinyl aromatic monomer represented by formula VIII or a mixture thereof.

6. A composition of claim 4 wherein component (A-2) is a mixture of an acrylate monomer represented by formula VII and a vinyl aromatic monomer represented by formula VIII.

7. A polymer modified hydroxyaromatic triazine-containing oligomer resulting from trimerization of the polymer modified cyanate mixture of claim 1.

8. A polymer modified hydroxyaromatic triazine-containing and oxazoline-containing oligomer or polymer resulting from copolymerization of the polymer modified cyanate mixture of claim 1 and one or more epoxy resins represented by formulas IX, X, XI, XII.

9. A polymer modified hydroxyaromatic triazine-containing and oxazoline-containing oligomer of claim 8 resulting from cooligomerization of the polymer modified cyanate mixture of claim 1 and one or more epoxy resins represented by formulas IX, X, XI, XII wherein a mole ratio of about 1 to 10 to about 1 to 100 of epoxy groups to cyanate groups is used.

10. A polymer modified hydroxyaromatic triazine-containing and oxazoline-containing oligomer of claim 9 resulting from cooligomerization of the polymer modified cyanate mixture of claim 1 and an epoxy resin represented by formula X.

11. An epoxy resin composition resulting from dehydrohalogenating the reaction product of a polymer modified hydroxyaromatic triazine-containing oligomer of claim 7 and an epihalohydrin.

12. An epoxy resin composition resulting from dehydrohalogenating the reaction product of a polymer modified hydroxyaromatic triazine and oxazoline-containing oligomer of claim 9 and an epihalohydrin.

13. An advanced epoxy resin composition resulting from reacting (A) a polymer modified hydroxyaromatic triazine-containing oligomer of claim 7 and (B) one or more epoxy resins represented by formulas IX, X, XI, XII wherein components (A) and (B) are employed in quantities which provide a hydroxyl to epoxy mole ratio of from about 0.01 to 1 to about 0.99 to 1.

14. The composition of claim 13 wherein components (A) and (B) are employed in quantities which provide a hydroxyl to epoxy mole ratio of from about 0.05 to 1 to about 0.70 to 1.

15. The composition of claim 14 wherein components (A) and (B) are employed in quantities which provide a hydroxyl to epoxy mole ratio of from about 0.10 to 1 to about 0.50 to 1.

16. An advanced epoxy resin composition resulting from reacting (A) a polymer modified hydroxyaromatic triazine-containing and oxazoline-containing oligomer of claim 9 and (B) one or more epoxy resins represented by formulas IX, X, XI, XII wherein components (A)

and (B) are employed in quantities which provide a hydroxyl to epoxy mole ratio of from about 0.01 to 1 to about 0.99 to 1.

17. The composition of claim 16 wherein components (A) and (B) are employed in quantities which provide a hydroxyl to epoxy mole ratio of from about 0.05 to 1 to about 0.70 to 1.

18. The composition of claim 17 wherein components (A) and (B) are employed in quantities which provide a hydroxyl to epoxy mole ratio of from about 0.10 to 1 to about 0.50 to 1.

19. A product resulting from curing a composition comprising (A) a composition or mixture of the compositions of claims 11, 12, 13, 14, 15, 16, 17 or 18 and (B) a curing quantity of at least one suitable curing agent and/or curing catalyst therefor.

20. A product of claim 19 which is reinforced with a natural or synthetic reinforcing material.

21. A product of claim 20 wherein said reinforcing material is a fibrous material which is in woven, mat, random fiber or continuous roving form or a combination thereof.

22. A product of claim 21 wherein said fibrous material is glass, carbon, graphite, aramid or combination thereof.

* * * * *